United States Patent Office 3,356,477
Patented Dec. 5, 1967

3,356,477
METHOD OF INCREASING STAIN RESISTANCE OF A GLASS BODY SUBJECTED TO AN ION EXCHANGE STRENGTHENING SET-UP
Raymond S. Chisholm, Pittsburgh, George E. Sleighter, Natrona Heights, and Fred M. Ernsberger, Pittsburgh, Pa., assignors to Pittsburgh Plate Glass Company, Pittsburgh, Pa., a corporation of Pennsylvania
No Drawing. Filed Apr. 17, 1967, Ser. No. 631,125
15 Claims. (Cl. 65—30)

ABSTRACT OF THE DISCLOSURE

This invention is directed to a method for producing improved glass articles. More specifically, the present invention is directed to a procedure for simultaneously imparting improved moisture resistance, stain resistance, and other related properties to alkali silicate glass articles while chemically strengthening them by exchange treatment with a salt of an alkali metal having a larger ionic diameter than an alkali metal of the base glass. These improvements are obtainable by maintaining a low level of alkalinity in the alkali metal salt.

Cross references to related applications

This application is a continuation-in-part application of our copending application Ser. No. 328,060 filed Dec. 4, 1963, which was a continuation-in-part application of applications Ser. Nos. 249,790 and 264,708 filed, respectively, on Jan. 7, 1963, and Mar. 12, 1963, the latter application now abandoned while application Ser. No. 249,790 has issued as U.S. Patent No. 3,287,201.

Disclosure

According to the present invention, glass articles can be provided with a valuable combination of high strength and surface stain resistance by contacting the base glass with a salt of an alkali metal having a larger ionic diameter than the preponderant alkali metal of the base glass at a temperature below the glass strain point while maintaining the alkalinity level of the exchange bath sufficiently low to prevent staining of the glass when subjected to a cyclic humidity test. The alkalinity level of the bath should be below about 0.025 percent and, for best results, below about 0.0015 percent, preferably below about 0.0010 percent by weight hydroxyl (OH).

Recently, various chemical treatments have been proposed to strengthen glass. One such chemical strengthening method involves treatment of soda-lime-silica glass with molten potassium nitrate at a temperature below the glass strain point to effect exchange of potassium from the potassium nitrate salt for sodium present in the glass. This creates a zone of compressive stress at the surface of the glass, thereby enhancing the strength thereof.

The exchange of potassium ions for sodium ions changes the chemical nature of the surface of the glass and even though the glass exhibits no visible attack by the exchange treatment, it has been found to be more susceptible to moisture attack and staining than the base glass prior to the exchange strengthening treatment. This lack of stain resistance detracts from the wide adoption of such strengthened glasses as viewing closures. Such strengthened glasses display especially poor stain resistance when contacted with water vapor containing salt, such as at seashore areas.

Why such chemical strengthened glass surfaces are more susceptible to moisture attack and its consequent staining and discoloration is not understood. However, applicants have discovered that the stain resistance of such exchange strengthened soda-lime-silica glasses can be considerably improved by carefully preventing the alkalinity level of the alkali metal salt bath employed for the strengthening treatment from rising unduly. This control has been found to be necessary due to the steady increase in alkalinity of the bath as it is maintained at the treatment temperature.

It is convenient to measure alkalinity of the salt by titrating alkalinity with acid in an aqueous solution and computing the alkalinity in terms of the alkaline hydroxyl ion. However, it is possible that the alkalinity in the salt may be due not only to the actual presence of alkali metal hydroxides but also to the oxides or carbonates or other compounds thereof which in aqueous media titrate as the hydroxide.

In order to achieve the desired stain resistance, this alkalinity must be held to a surprisingly low level although the exact tolerable maximum concentration varies with the composition of the glass subjected to treatment. It should be held well below 0.025 percent by weight of alkalinity calculated as hydroxyl.

In this invention, it has been generally found that stain resistance of the resulting glass is satisfactory if the alkalinity is maintained in a range of about 0.0015 percent OH by weight or below. Tolerable alkalinity in the order of magnitude may, of course, exceed the exact figure of 0.0015, being as high as 10 to 15 times this value, for example, with the lithium glass identified below, while nevertheless remaining in this range. The objective is simply to hold alkalinity low enough so that substantial stain does not develop in the glass during its use or in the course of accelerated weathering tests such as described in the appended examples.

The control of the alkalinity in the bath at the extremely low level does not interfere with the increase in strength of the base glass which is achieved by the alkali metal exchange treatment.

While several methods of controlling the alkalinity level of the exchange bath have been employed, one type of procedure yields exceptionally good results and is highly efficient. This procedure involves treating the ion exchange bath with an acid gas, e.g., $SO_2$ gas, either anhydrous or in commercial form containing some water. The $SO_2$ gas is bubbled as required from the bottom up through the body of the molten alkali metal exchange salt bath to maintain the alkalinity below about 0.025 percent hydroxyl (OH). Consistently good stain resistance is secured by maintaining the alkalinity level at or below 0.0015 percent and preferably below about 0.0010 percent by weght hydroxyl (OH).

When conducting the combined alkali metal salt strengthening and stain resistance treatment, care must be exercised to avoid thermally eradicating the alkali metal exchange induced surface strength (compressive stress). Generally, it is advisable to employ short contact times when high temperatures are used in the alkali metal strengthening treatment. Usually the alkali metal exchange strengthening treatment is conducted at a temperature below the glass strain point to avoid thermal relaxation. However, the temperature at which the exchange strengthening treatment is conducted should not be so low that an unduly long period of time is required to get strengthening.

Strengthening of soda-lime-silica base glass articles can be conducted rapidly in an efficient manner by contacting the base glass with molten potassium nitrate at a temperature of at least 870° F. but below the glass strain point for a time period ranging from about 5 to about 40 minutes. According to the present invention, it is preferable to conduct the potassium exchange strengthening treatment at temperatures well below the glass strain point, viz., at temperatures from 10 to 50° F. below the glass strain point, e.g., temperatures ranging from 875° to about 950° F. for time periods ranging from 10 to 20 minutes in the case of most soda-lime-silica glasses. Consistently good rapid exchange strengthening treatments can be conducted at temperatures ranging from 900° to approximately 930° F. for periods ranging from about 10 to 20 minutes.

Ion exchange of lithia-alumina-silica glasses may be conducted in sodium salt baths at temperatures as low as 750° F. and lower with good results. Higher temperatures, however, promote a more rapid exchange of the sodium ion for the lithium ion of the glass.

One of the chief benefits of the present invention resides in the fact that the strengthening and stain resistance treatment are secured by a single operation. Hence, no aftertreatment is required to condition the glass surface to improve its stain resistance subsequent to alkalinity controlled ion exchange strengthening treatment.

This invention is applicable to a wide range of alkali silicate glasses and particularly to a wide range of soda-containing silica glasses. In such glasses, $SiO_2$, $B_2O_3$ and/or $Al_2O_3$ can be the principal network formers and various alkali and alkaline earth metal oxides can be present as fluxes to aid in the melting of the base glasses. For example, silicate glass containing in excess of 40 percent by weight of $SiO_2$, 0 to 15 percent by weight of $B_2O_3$, 0 to 15 percent by weight of $Al_2O_3$, 0 to 25 percent by weight of CaO and MgO, SrO, BaO, PbO and/or ZnO and combinations thereof, 0 to 10 percent by weight $TiO_2$, 0 to 5 percent by weight $Li_2O$, 0 to 10 percent by weight $K_2O$ and 2 to 20 percent by weight of sodium oxide can be employed in the practice of this invention. Moreover, the base glasses can contain small effective amounts, e.g., 0 to 1 percent by weight, of various coloring agents, such as $Fe_2O_3$, NiO, CoO, Se and various combinations thereof.

The present invention offers improvements in strength and stain resistance when applied to glass articles conventionally produced from soda-lime-silica glass compositions such as those presently employed for window and plate glass. Such soda-lima-silica glass compositions usually have the following glass compositions:

| Component: | Percent by weight |
|---|---|
| $SiO_2$ | 65 to 75 |
| $Na_2O$ | 10 to 15 |
| $K_2O$ | 0 to 5 |
| CaO | 5 to 15 |
| MgO and/or ZnO | 0 to 10 |
| $B_2O_3$ | 0 to 5 |
| $Na_2SO_4$ | 0 to 1.0 |
| NaCl | 0 to 0.3 |
| $Fe_2O_3$ | 0 to 1.0 |
| $Al_2O_3$ | 0 to 3.5 |
| $As_2O_5$ | 0 to 0.5 |
| BaO | 0 to 0.7 |
| NiO | 0 to 0.1 |
| CoO | 0 to 0.1 |
| Se | 0 to 0.1 |
| $So_3$ | 0 to 0.5 |

A typical soda-lime-silica glass suitable for treatment in accordance with this invention has the following composition:

| Component: | Percent by weight |
|---|---|
| $SiO_2$ | [1] 71.38 |
| $Na_2O$ | [2] 12.76 |
| $K_2O$ | [3] 0.03 |
| CaO | [4] 9.67 |
| MgO | [5] 4.33 |
| $Na_2SO_4$ | [6] 0.75 |
| $Fe_2O_3$ | [7] 0.15 |
| $Al_2O_3$ | [8] 0.81 |

[1] Usual variation 71 to 74.
[2] Usual variation 12 to 14.
[3] Usual variation 0 to 1.
[4] Usual variation 6 to 12.
[5] Usual variation 2 to 5.
[6] Usual variation 0.1 to 1.0.
[7] Usual variation 0.1 to 1.0.
[8] Usual variation 0.1 to 1.0.

According to the preferred feature of this invention a potassium salt is employed for the ion exchange strengthening treatment. The potassium salt is contacted with the glass article while the potassium salt is maintained in molten condition. The contact is effected conveniently by immersing the glass to be strengthened in the molten potassium nitrate salt bath, and periodically or continuously bubbling $SO_2$ gas as required from the bottom of the treating bath to maintain the alkalinity level in the body of the salt bath within the limits set forth hereinabove.

As used herein the terms "contact temperature," "equilibrium temperature of reaction," etc. are employed to denote the temperature at which the ion exchange strengthening is conducted. Conveniently this temperature is arrived at by preheating and maintaining the ion exchange salt bath at a temperature at which the ion exchange is to be conducted, and preheating the glass to be treated to a temperature approximating that at which the alkali metal salt bath is maintained. It is generally preferable to preheat the glass articles to be treated to a temperature closely approximating that at which the ion exchange is to be conducted, viz., a temperature ranging from 30° to 0° F. above or below the treating temperature. However, it should be realized that the glass can be heated to a higher temperature than that at which the potassium salt bath is maintained, and the converse is also true. It is within the purview of this invention to employ any combination of glass temperature and alkali metal salt bath temperature which yields a composite (equilibrium) temperature of reaction of below the glass strain point. Further, it is within the purview of this invention to immerse the glass articles to be treated directly into the preheated alkali metal salt bath without preheating of the glass articles.

Also potassium salts other than potassium nitrate can be employed to strengthen soda-lime-silica glasses, e.g., potassium chloride, potassium sulfate, potassium bromide and various mixtures of the four above-mentioned materials, which can be molten or solid at the treating temperatures. The corresponding nitrates, chlorides, sulfates and bromides of rubidium and cesium can be used instead of potassium, or as an after treatment thereto.

The contact treating time, viz., the length of time for which the glass article is contacted with the potassium treating salt at the temperatures at which ion exchange occurs, generally ranges from about 5 to 40 minutes for the usual temperature range of about 875 to 950° F. In general, treatment times substantially in excess of 40 minutes at temperatures substantially in excess of about 950° F. do not materially improve the strength which attends the present invention over those attained in shorter periods.

In fact, prolonged contact at such temperatures can be objectionable. It has been observed that prolonged heating (two or more hours) of the treated glass at temperatures substantially in excess of 950° F., whether in contact with the potassium exchange bath or after strengthening, results in loss of strength. For example, heating the glass articles for a period in excess of two hours at 1000° F. while in contact with the potassium salt results in a material loss in the strength improvement attained at the shorter periods mentioned above.

The reason for this loss is not completely understood; however, it can be postulated that over an extended period of time at these high temperatures there is a thermal relaxation of the compressive stresses set up in the glass by the larger atomic diameter alkali metal ion exchange. Also there may occur in the glass a rearrangement or migration of the potassium and sodium which rearrangement or migration results in reduced strength. For these reasons the glass, after treatment, should be cooled to a temperature below about 800° F. and preferably below a temperature of 400° F. in a rapid manner and in any event before the compressive stress imparted to the glass is significantly reduced. For example, the strengthened glass can be cooled over a ten-minute period without glass breakage. However, cooling should not be carried out so rapidly as to break the glass due to thermal shock.

The term "strain point" as used herein is a standard term in the glass art and is defined in the American Society for Testing Materials, Booklet C 162–56.

While the alkalinity control of the alkali metal salt exchange strengthening bath is preferably achieved by introducing $SO_2$ gas therein, this control can be effected by the use of other materials which are capable of reducing alkalinity yet are essentially inert to the ion exchange reaction. For example, instead of using $SO_2$ gas, the alkalinity control can be obtained by bubbling an acid gas such as $NO_2$ through the alkali metal salt exchange bath.

The introduction of the alkalinity control material can be accomplished periodically or continuously as desired as the strengthening bath is used from hour to hour or day to day, the important criteria being the alkalinity conditions of the alkali metal salt exchange bath at any given stage of a treating campaign. To obtain uniformly good results, the alkalinity control material is introduced into and uniformly contacted with the alkali metal salt exchange bath when the alkalinity thereof approaches 0.001 percent by weight hydroxyl (OH), e.g., $SO_2$ gas is bubbled through the bath by means of any suitable dispensing device such as a bubbler rod which is inserted into the tank at the bottom of the molten bath. The alkalinity is checked repeatedly during the $SO_2$ introduction until the bath alkalinity is lowered to approximately 0.0006 to about 0.0003 percent by weight hydroxyl (OH). No adverse results are experienced at slightly acidic bath conditions, i.e., less than about 0.0005 percent by weight hydrogen ion in the bath. Therefore, there seems to be no problem on occasions when more $SO_2$ gas than necessary to reduce alkalinity in the bath is bubbled into the bath.

Strength tests (soft ball drop, concentric ring and steel ball impact) clearly show that no reduction in strength occurs in the glasses treated in alkali metal salt exchange strengthening baths having their alkalinity controlled as set forth herein. The strength of these glasses is approximately the same as that of glasses treated with ion exchange strengthening baths having no alkalinity control. However, the stain resistance and moisture resistance of the glasses treated in accordance with this invention are superior to those produced by alkali metal ion exchange strengthening without alkalinity control. Therefore, in accordance with this invention, the advantages of stain resistance and moisture resistance can be secured in a one-step procedure without loss of strength.

The invention will be described in more detail in the examples which follow. However, it should be realized that the present invention in its broadest aspects is not necessarily limited to the particular materials, temperatures, times and other process parameters set forth hereinbelow.

EXAMPLE I

| Component: | Composition (percent by weight) |
|---|---|
| $SIO_2$ | 71.65 |
| $Na_2O$ | 13.20 |
| $K_2O$ | 0.03 |
| $CaO$ | 11.83 |
| $MgO$ | 2.40 |
| $Al_2O_3$ | 0.20 |
| $Na_2SO_4$ | 0.57 |
| $Fe_2O_3$ | 0.117 |

Three groups of polished soda-lime-silica glass plates 12 inches by 12 inches by 0.125 inch of the glass composition listed above are provided.

One group of these plates, hereinafter referred to as Group 1, was washed, cleaned and set aside for strength and moisture resistance testing. The samples of this group received no alkali metal exchange strengthening treatment whatsoever.

A second group of these plates, hereinafter referred to as Group 2, was strengthened by immersion in molten potassium nitrate salt at 925° F. for 10 minutes. These plates were immersed at different times with the alkalinity level of the potassium nitrate bath being raised arbitrarily to an initial level above that of a fresh bath by the addition of KOH to the bath at different times. The alkalinity levels during the treatment period ranged from about 0.015 to 0.023 percent by weight OH.

A third group of these plates, hereinafter referred to as Group 3, was strengthened by immersion in molten potassium nitrate salt at 925° F. for 10 minutes. The alkalinity of the molten potassium nitrate bath was maintained at less than about 0.001 percent by weight hydroxyl (OH), throughout the treatment campaign by bubbling $SO_2$ gas into the bottom of the molten potassium nitrate bath. Over a one-week treating campaign, this alkalinity control was achieved by bubbling $SO_2$ gas for a 20-minute period (approximately one pound of $SO_2$) once a day into the treating tank which contained approximately 2000 pounds of molten $KNO_3$.

The potassium alkali metal exchange strengthening treatment of the Groups 2 and 3 plates was conducted in the following manner. The glass plates were placed in horizontal stainless steel carrying racks with each sheet being carried at a slope of 15 degrees with the horizontal axis of the carrying rack. Fiber glass tape without binder was wrapped around the support posts of the stainless steel carrying racks and over the weight bearing support points to reduce possible mechanical damage to the edge of the glass sheets. The fiber glass tape also served to reduce the heat transfer rate from the edge of the glass to the support posts. The plates were conveyed parallel to the horizontal path of the racks along the treatment line.

The plates were then preheated in a glass lehr to raise the glass temperature from ambient room temperature to a temperature of from 900° F. to 925° F. using radiant gas burners operated at an air-to-gas ratio of 12 to 1. The preheating operation was conducted over a period of about 17 minutes. Then the preheated plates were immersed with their racks into a molten potassium nitrate bath maintained at a temperature of 925° F. for an immersion period of 10 minutes.

The lehr was heated from above with gas heat supplied by radiant gas burners disposed several feet above the level of the molten pool, and these burners were also operated at an air-to-gas ratio of 12 to 1, and from below by electric heating devices placed in the bottom of the lehr external to the treating tank to insure the maintenance of a uniform treating temperature in the molten potassium nitrate bath. The temperature controls employed in the tank containing the molten potassium nitrate were such that allow the temperature of 925° F. to be maintained within about a plus or minus 10° F. temperature deviation.

The tank containing the molten potassium nitrate was 6 feet by 3 feet by 13.5 inches to allow total immersion of the flat glass plates. The molten salt bath was maintained at approximately a 12-inch depth sufficient to insure total immersion of the glass plates. The tank contained approximately 2000 pounds of $KNO_3$.

After contacting the glass plates with molten potassium nitrate for a period of approximately 10 minutes, the racks were then raised out of the molten potassium salt treating bath and conveyed through an insulated tunnel cooling section of the lehr to allow cooling thereof in a gradual manner so that the drop in temperature during the cooling operation would not cause warpage or breakage.

After effecting a substantial degree of cooling, viz., cooling to a temperature of approximately 200° F. to 250° F., the glass was then allowed to cool to the ambient room temperature outside the oven. The entire period of cooling from the time the glass was removed from the molten potassium salt pool was about 30 to 35 minutes.

The glass was then racked while at approximately room temperature with the width dimension of the racked plates essentially in a vertical position, and the treated glass plates were washed with water to remove excess potassium nitrate. Then the potassium strengthened plates were allowed to dry in a vertical position at room temperature.

Then random samples of the test plates of Groups 1, 2 and 3 were tested for strength and durability.

The load strength test was conducted on 6 inch by 6 inch specimens cut from the plates using an Instron testing machine using concentric ring loading with the test sample resting on the larger (outer) ring. The outer ring had a diameter of 5¾ inches and the inner ring had a diameter of 3 inches. The load speed was 0.02 inch per minute, and the reported load strengths are the compressive strengths (pounds per square inch) at which failure (glass breakage) occurred. These values were determined by multiplying the actual tested breaking strength (pounds) by the compressive stress conversion factor, which is 29.7 for 0.125 inch thick lime-soda-silica plate glass.

Both the Soft Ball Impact and Steel Ball Impact tests were performed on 12 inch by 12 inch by ⅛ inch plates held horizontally in an unpadded square wooden frame having a ⅜ inch support ledge.

The Soft Ball Impact test was conducted with a 0.42 pound, 3.5 inch diameter soft ball suspended by a looped cotton cord from varying heights on a conventional ball drop testing machine. The values listed in the table below are expressed in foot pounds (at failure) and reflect the height of drop at which glass breakage occurred.

The Steel Ball Impact test was conducted using a 0.5 pound steel ball dropped at varying heights from a conventional ball drop testing machine. The reported values are in foot pounds and indicate the height of drop at which glass breakage occurred.

The stain resistance test was a cyclic humidity exposure test designed as an accelerated weathering test. The test was performed in an insulated, electric coil heated, air incubation oven. The heating was conducted at atmospheric pressure in recurring 90-minute heating and cooling cycles with 90 minutes of heating followed by 90 minutes of cooling and so forth. During the heating cycles the temperature inside the oven was raised to a temperature of 140° F. to 150° F. During the cooling cycle the temperature was reduced to 120° F., which temperature was maintained during cooling.

The samples were placed on stainless steel racks mounted in a 2 foot by 1.5 foot 1.5 foot glass tank (stainless steel frame). The tank contained water filled to a depth of 1 inch from the tank bottom. The stainless steel racks were mounted in the tank about 2 inches above the bottom of the tank. During the heating periods, the moisture vapor conditions in the oven tended to cause evaporation of the water so that a condition of nearly 100 percent relative humidity is reached in the tank. During the cooling periods, the moisture vapor condenses on the glass surfaces, thus promoting moisture attack on the glass.

The stain resistance of each sample was arrived at by holding the samples at an angle of between 30 to 45 degrees to the source of light and visually evaluating the samples for degree of staining in a source of light. The source of light can be sunlight or any convenient "point" source of light, e.g., a slide projector lamp or a motion picture projector lamp.

The data from the durability and strength tests are summarized below in the table which includes alkalinity readings of the molten $KNO_3$ baths at typical stages in a given 24 hour strengthening campaign for Groups 2 and 3.

The alkalinity level determination is performed by taking a five gram sample taken from the $KNO_3$ treatment bath and dissolving it in 100 milliliters of distilled water. The solution is then titrated with 0.01 normal hydrochloric acid, using Fleisher methyl-purple as an indicator. From titration, the OH content is calculated as percent OH.

TABLE

| Property | Group "1" | Group "2" | Group "3" |
| --- | --- | --- | --- |
| Alkalinity of $KNO_3$ bath (percent OH) | | 0.015-0.023 | 0.00065-0.001 |
| Load strength before strengthening treatment (pounds per square inch) | 8,308 | 8,308 | 8,308 |
| Load strength after strengthening treatment (pounds per square inch) | | 26,270 | 26,270 |
| Soft Ball Impact Test (foot pounds) | 2.4 | 7.0 | 7.0 |
| Steel Ball Impact Test (foot pounds) | 0.89 | 3.2 | 3.2 |
| Stain Resistance to Cyclic Humidity Test after 1 hr. exposure (degree of stain) | (1) | (2) | (1) |
| Stain Resistance to Cyclic Humidity Test after 8 hrs. exposure (degree of stain) | (3) | (2) | (1) |

1 Good (No Stain).
2 Poor (Severe Stain).
3 Fair (Slight Stain).

The tests clearly establish that the advantageous combination of glass strengthening and stain resistance can be achieved in a one-step procedure by controlling the alkalinity of the alkali metal salt strengthening bath within the limits set forth herein.

All of the samples were optically satisfactory prior to stain resistance testing. When the alkalinity level was too high, the glass had poor stain resistance as evidenced by staining upon exposure to moisture vapor (Group 2). The samples which were strengthened at an alkalinity level below about 0.001 percent by weight OH had a stain resistance equal to or better than regular polished plate glass. It was found further that the stain resistance of samples treated as those of Group 2 could not be improved by further treatment with $ZnCl_2$ just after the strengthening treatment. In fact, in some cases, the $ZnCl_2$ stain resistance treatment served to magnify glass surface discoloration occurring during the cyclic humidity tests.

The use of a gaseous alkalinity control agent is usually more desirable than a solid one. Hence, under most conditions, the use of an acid gas, viz., a gaseous agent capable of reducing alkalinity, is preferred when the alkalinity control agent is employed directly in the alkali metal strengthening bath.

While the above example refers to the use of the alkalinity control agent in the alkali metal salt strengthening bath itself, other ways of achieving alkalinity control can be used. For example, portions of the alkali metal strengthening salt can be recycled continuously or intermittently through an alkali control area such as a stand pipe into which the $SO_2$ is bubbled and then back to the treating tank.

If desired, the larger atomic diameter alkali metal strengthening treatment can be a non-immersion process, e.g., a paste coating of alkali metal salt and high silica clay; or a fluidized bed of alkali metal salt using an acid gas as the fluidizing agent.

Moreover, glass articles can be strengthened in accordance with this invention by a plurality of alkalinity controlled alkali metal exchange strengthening treatments, each successive alkalinity controlled exchange strengthening treatment employing a salt or salts of an alkali metal having a larger atomic diameter than that employed for the previously conducted alkali metal strengthening treatment, with all such treatments being conducted below the glass strain point. For example, rubidium and cesium salts, respectively, can be used to further strengthen potassium exchange strengthened glass.

The present invention is particularly useful in the treatment of glass viewing closures, e.g., windows; doors; windshields, backlights, sidelights and roofs for automobiles, airplanes, boats and other vehicles and transportation media; TV implosion and explosion panels (shields); architectural spandrels, and similar closures and partitions for buildings, compartments and appliances.

Such articles are usually made from lime-soda-silica glass because it is more economical. However, the invention is also applicable to chemically strengthened lithium silicate glasses such as a lithia-alumina-silica glass or a lithia-zirconia-silica glass which is treated by immersion in a molten sodium nitrate bath at a temperature below the strain point. These glasses and their methods of treatment are described in further detail in South African Patents Numbers 62/2352, 62/2353, and 62/2354.

EXAMPLE II

To illustrate the desirability of maintaining a low level of alkalinity in the ion exchange bath during the strengthening of a lithia-alumina-silica glass, the following experiment was conducted.

The lithia-silica-alumina glass had the following composition.

| Oxide: | Percent by weight |
| --- | --- |
| $SiO_2$ | 44.4 |
| $Al_2O_3$ | 26.6 |
| $Li_2O$ | 5.0 |
| $Na_2O$ | 11.0 |
| $P_2O_5$ | 10.0 |
| ZnO | 3.0 |

Glass plates 12 inches by 12 inches by 0.125 inch of the above composition were immersed in a sodium nitrate bath for four hours at 750° F. with the OH concentration of the bath being varied. The preparation of the glass plates prior to and after ion exchange was conducted in the manner outlined in Example I.

An OH concentration of 0.0985 percent by weight OH caused severe surface damage while a concentration of 0.04 percent by weight OH produced a light stain upon the glass. These effects were noticeable immediately after the glass was removed from the ion exchange bath.

Additional samples were ion exchanged under varying concentrations of OH ion for the purpose of determining the effect of cyclic humidity thereupon. The only sample still acceptable after 12 days' exposure to the cyclic humidity test was a glass plate which had been immersed for four hours at 750° F. in a sodium nitrate bath having an OH ion concentration of 0.02 percent by weight OH.

Although the present invention has been described with respect to specific details of certain embodiments thereof, it is not intended that such details serve as limitations upon the scope and spirit of the present invention. The present invention in its broadest aspects is not necessarily limited to the specific compositions, temperatures, treatment times, and alkali control agents specified in these foregoing examples.

What is claimed is:

1. A method of strengthening an alkali silicate glass which comprises contacting the glass with a salt of an alkali metal having a larger ionic diameter than an alkali metal in said glass at a temperature below the glass strain point for a period of time sufficient to achieve alkali metal ion exchange in an amount sufficient to obtain a compressive stress at the surface of the glass while maintaining the alkalinity of said salt sufficiently low to prevent staining of said glass when subjected to cyclic humidity.

2. A method of strengthening an alkali silicate glass which comprises contacting the glass with a salt of an alkali metal having a larger ionic diameter than an alkali metal in said glass at a temperature below the glass strain point for a period of time sufficient to achieve alkali metal ion exchange in an amount sufficient to obtain a compressive stress at the surface of the glass while maintaining the alkalinity of said salt below 0.025 percent by weight OH.

3. The method of claim 2 wherein the alkali silicate glass is a lithia-alumina-silica glass.

4. The method of claim 3 wherein the temperature is below the strain point but above about 750° F.

5. A method of strengthening an alkali silicate glass which comprises contacting the glass with a salt of an alkali metal having a larger ionic diameter than an alkali metal in said glass at a temperature below the glass strain point for a period of time sufficient to achieve alkali metal ion exchange in an amount sufficient to obtain a compressive stress at the surface of the glass while maintaining the alkalinity of said salt below about 0.0015 percent by weight OH.

6. A method according to claim 5 wherein said contact is effected at a temperature of at least 875° F.

7. A method according to claim 5 wherein said glass is a soda-lime-silica glass.

8. A method according to claim 1 wherein said alkalinity control is accomplished by introducing an acid gas into said salt.

9. A method according to claim 5 wherein said contact is effected at a temperature ranging between 875° F. and up to 10° F. below the glass strain point.

10. A strengthened, moisture resistant glass article produced according to the method of claim 1.

11. A method of strengthening a plurality of soda-lime-silica glass articles which comprises contacting said glass articles at separate times with a salt of an alkali metal having a larger ionic diameter than sodium at a temperature of at least 875° F. but below the glass strain point for a period of time sufficient to achieve alkali metal ion exchange in an amount sufficient to obtain a compressive stress at the surface of the glass while controlling the alkalinity of said salt below about 0.001 percent by weight OH.

12. A method according to claim 11 wherein the salt is potassium nitrate.

13. A method according to claim 12 wherein said alkalinity control is accomplished by introducing $SO_2$ gas into said salt.

14. The process of claim 2 wherein the alkalinity of the bath is not substantially above 0.005 percent by weight hydrogen ion.

15. A method according to claim 5 wherein said contact is effected at a temperature ranging from about 875° F. to about 950° F.

No references cited.

DONALL H. SYLVESTER, *Primary Examiner.*

G. R. MYERS, *Assistant Examiner.*